W. A. UNDERHILL & C. C. AVERY.
STEERING MECHANISM FOR WAGON TRAINS.
APPLICATION FILED DEC. 3, 1913.
1,274,109.
Patented July 30, 1918.
2 SHEETS—SHEET 1.
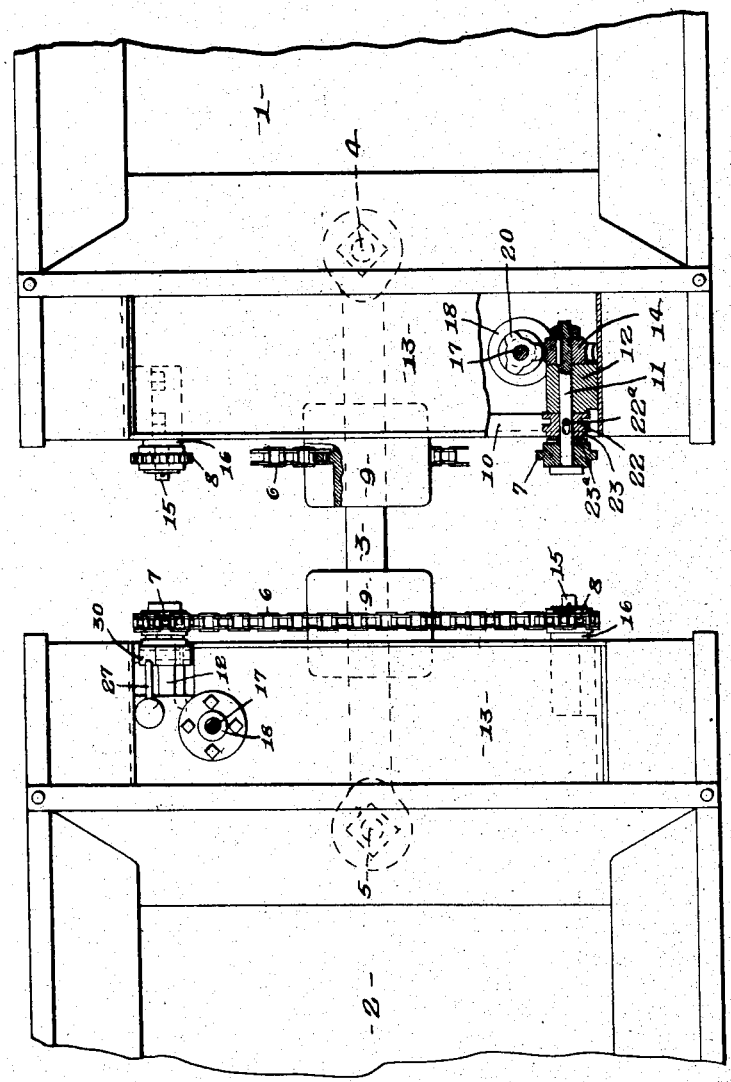

W. A. UNDERHILL & C. C. AVERY.
STEERING MECHANISM FOR WAGON TRAINS.
APPLICATION FILED DEC. 3, 1913.
1,274,109.
Patented July 30, 1918.
2 SHEETS—SHEET 2.
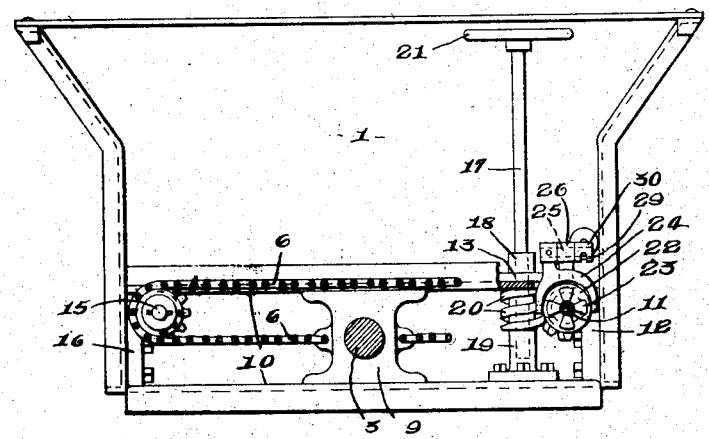
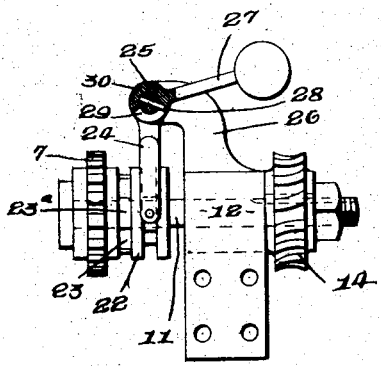
WITNESSES:
INVENTORS.
BY
ATTORNEYS.

UNITED STATES PATENT OFFICE.

WALTER A. UNDERHILL AND COURTNEY C. AVERY, OF AUBURN, NEW YORK, ASSIGNORS TO THE EAGLE WAGON WORKS, OF AUBURN, NEW YORK, A CORPORATION OF NEW YORK.

STEERING MECHANISM FOR WAGON-TRAINS.

1,274,109. Specification of Letters Patent. Patented July 30, 1918.

Application filed December 3, 1913. Serial No. 804,470.

*To all whom it may concern:*

Be it known that we, WALTER A. UNDERHILL and COURTNEY C. AVERY, citizens of the United States, and residents of Auburn, in the county of Cayuga and State of New York, have invented a certain new and useful Steering Mechanism for Wagon-Trains, of which the following is a specification.

This invention has for its object the production of mechanism for steering a train of carts from the front end of the train which is being pushed from the rear by a traction engine or other actuating means, which steering mechanism is particularly simple in construction and highly efficient and durable in use; and the invention consists in the novel combinations and constructions hereinafter set forth and claimed.

In describing this invention, reference is had to the accompanying drawings, in which like characters designate corresponding parts in all the views.

Figure 1 is a plan view of portions of two carts coupled together and provided with our steering mechanism.

Fig. 2 is an end elevation of the carts shown in Fig. 1, the coupling means being shown in section.

Fig. 3 is a detail view of the means for rendering the steering mechanism ineffective.

This invention comprises, generally, steering mechanism for a pair of two-wheeled carts having coupling means, which when the carts are in use is rigidly connected with one cart and pivotally connected to the other. The coupling means is preferably pivotally connected to both carts so that the carts can be drawn when desired and one will trail behind the other in the tracks thereof.

1 and 2 are the carts or wagons of the pair coupled together, as here shown by a tongue or bar 3 which is connected by pivot pins 4, 5 to the carts respectively, the tongue or bar extending centrally of the cars along the normal line of draft. In this embodiment of our invention, both carts are provided with steering mechanisms on the opposing ends thereof, the steering mechanisms being constructed so that either may be rendered ineffective to act on the tongue as when the carts are being drawn instead of pushed. When the carts are being drawn, the steering mechanism of the front cart is rendered idle so as not to affect the pivotal movement of the tongue and front cart.

The steering mechanism includes, generally, an actuator as a steering wheel and power transmitting means between the actuator and the tongue. It also includes means for disconnecting the power transmitting means from the actuator.

More specifically, the steering mechanism of each cart includes a belt 6 extending in opposite directions from the tongue and attached thereto in any suitable manner and having running connection with the cart on opposite sides of the line of draft, and means for actuating the belt.

The belt 6 as here shown is a chain running over sprocket wheels 7 and 8 carried by the cart on opposite sides of the tongue 3 and connected at its opposite ends to the tongue by means of a slide 9 mounted on the tongue and movable along a guide 10 formed in the end of each cart opposed to the other cart, the guide extending crosswise of the tongue. One of the sprocket wheels as 7 is mounted on a spindle or shaft 11 journaled in the bearing block 12 supported by the cart beneath the platform 13 therein and having a worm gear 14 at its inner end. The other sprocket wheel 8 is mounted on the spindle or shaft 15 similar to the shaft or spindle 11, the shaft 15 being journaled in a bearing block 16 similar to the block 12.

The means for operating the belt 6 comprises a vertical post or staff 17 journaled in bearings 18, 19 supported respectively on the platform 13 and on the bottom of the guide 10 of each cart, the post 17 having a worm 20 thereon located beneath the platform 13 and meshing with the worm gear 14. Said post 17 carries a steering wheel 21 on its upper end.

Owing to the worm and worm gear, the steering mechanism of each cart is practically self-locking and hence the steering mechanism, when in effective relation, rigidly connects the tongue to the carts. As it is necessary that the front cart have pivotal movement relatively to the tongue and the trailing cart when the carts are being drawn, the steering mechanism of each cart is constructed to be rendered ineffective.

As here shown, each steering mechanism is made ineffective by disconnecting the chain from the worm 20 on the steering post so that the chain is free running. In this embodiment of our invention, this result is accomplished by unclutching the sprocket wheel 7 from the shaft or spindle 11.

The sprocket wheel 7 of each steering mechanism is loosely mounted on the shaft 11 and is normally connected to the shaft 11 to rotate therewith by means of a manually shiftable clutch section 22 slidably keyed to the shaft at 22$^a$ and movable axially on the shaft 11 and having clutch teeth 23 for interlocking with complemental clutch teeth 23$^a$ provided on the gear 7. As here illustrated, the clutch section 22 is shifted by means of a fork 24 mounted on a rock shaft 25 journaled in the bracket 26 rising from the bearing block 12, and the rock shaft is actuated by means of a weighted rock arm 27 mounted thereon and connected thereto by a lost-motion connection including a pin 28 projecting from the rock shaft and working in a slot 29 in the hub 30 of the lever 27.

The clutch section 22 requires very little shifting movement and owing to the lost motion connection due to the pin 28 and slot 29, the shifting operation of the clutch section is not effected until nearly the end of the throw of the lever 27 in either direction, and hence the weight of the lever holds the clutch section in either of its shifted positions. Any suitable means may be provided for making the chain free running.

In operation, when the carts are being pulled by a traction engine or any other traction means, the steering mechanism of the front cart is in ineffective position in order to hold the tongue from pivotal movement about the pivot 4 relatively to the front cart, while the steering mechanism of the rear cart is rendered effective by shifting the clutch section 22 into engagement with the sprocket wheel 7, thus permitting the rear cart 2 to trail.

When, however, the carts are being pushed, the clutch 22, of the cart that happens to be the rear cart, is shifted into connection with the sprocket wheel 7 when the tongue is in central position so that the tongue and rear cart are practically rigidly connected together. The clutch section 22 of the steering mechanism of the front cart is also interlocked with the clutch teeth of the sprocket wheel 7 and during turning of the steering wheel 21 of the mechanism of the front cart, the front cart is moved about its pivot 4 relatively to the tongue 1.

Owing to the self-locking feature of this steering mechanism, the tongue can be rigidly connected to either cart, and owing to the shiftable clutch section 22, the carts can be disconnected from their steering mechanism when being trailed.

Although we have shown both carts as provided with steering mechanisms, but one cart may be provided therewith and the tongue held, when desired, from pivotal movement relatively to the other cart, that is, rigid with the other cart by the usual locking pins, as will be understood by those skilled in the art. As these locking pins are easily lost and bent, we prefer to dispense with them by providing both carts with self-locking steering mechanism which can be rendered ineffective.

In use, the steering mechanism, which is not being used for steering purposes, is means for rigidly connecting the tongue to one cart to render the pivotal movement of the cart and the tongue ineffective.

What we claim is:—

1. The combination of a pair of two-wheeled carts, a tongue connecting the same and pivotally connected to both carts, means for rigidly connecting the tongue to one cart to render the pivotal movement of said cart and the tongue ineffective, the other cart being formed with a guide extending transversely of the tongue, a slide mounted on the tongue and movable along the guide, and steering mechanism on the latter cart and including wheels carried thereby on opposite sides of the tongue, a belt running over the wheels and secured to the slide, and means for actuating the belt, substantially as and for the purpose described.

2. The combination with a pair of carts having a tongue coupling the same together and pivotally connected to both carts and serving to transmit pushing and pulling force from one cart to the other, means on one cart for rendering the pivotal connection between the tongue and said cart ineffective and thereby rigidly connecting the tongue and said cart; of steering mechanism carried by the other cart including an actuator carried by the latter cart, power transmitting means between the actuator and the tongue, the actuator being self-locking in order to hold the latter cart in any position it is shifted relatively to the tongue, and means for disconnecting the actuator from the power transmitting means, substantially as and for the purpose specified.

3. The combination with a pair of carts having means coupling the same together and pivotally connected to both carts, of steering mechanisms carried by the carts on the opposing end thereof, each steering mechanism being connected to the coupling means and being self-locking in any position to which it is shifted, and each steering mechanism including means operable to render the steering means ineffective for permitting free pivotal movement of either cart relatively to the coupling means, substantially as and for the purpose described.

4. The combination of a pair of two-wheeled carts, a tongue coupling the same and being pivotally connected to both carts, of steering mechanisms carried by the carts on the opposing ends thereof, each steering mechanism including a belt secured to the coupling means and extending in opposite directions therefrom and having running connection with its cart on opposite sides of the tongue, means for actuating the belt in opposite directions, the actuating means being self-locking to hold the belts in any position to which they are moved, and means for disconnecting the actuating means from the belts for rendering the belts free running, substantially as and for the purpose specified.

5. The combination of a pair of two-wheeled carts and a tongue connecting the same, the tongue being pivotally connected to both carts and both carts being formed with guides on their opposing ends extending transversely of the tongue, slides mounted on the tongue and movable along the guides respectively, steering mechanisms mounted on the carts, the steering mechanism of each cart including wheels carried thereby on opposite sides of the tongue, a belt running over the wheels and secured to the slide, and means for actuating one of the wheels, substantially as and for the purpose set forth.

6. The combination of a pair of two-wheeled carts and a tongue connecting the same, the tongue being pivotally connected to both carts and both carts being formed with guides on their opposing ends extending transversely of the tongue, slides mounted on the tongue and movable along the guides respectively, steering mechanisms mounted on the carts, the steering mechanism of each cart including wheels carried thereby on opposite sides of the tongue, a belt running over the wheels and secured to the slides, and means for actuating one of the wheels, said means being self-locking to hold the belt in any position it is shifted and each steering mechanism including a part operable to disconnect its belt from the actuating means for rendering the belt free running, substantially as and for the purpose described.

In testimony whereof, we have hereunto signed our names in the presence of two attesting witnesses, at Auburn, in the county of Cayuga, in the State of New York, this 18th day of Nov., 1913.

WALTER A. UNDERHILL.
COURTNEY C. AVERY.

Witnesses:
MARIE M. KINCHLEY,
CHAS. H. YOUNG.

Copies of this patent may be obtained for five cents each, by addressing the "Commissioner of Patents, Washington, D. C."